US 12,177,523 B2

(12) United States Patent
Sun

(10) Patent No.: US 12,177,523 B2
(45) Date of Patent: *Dec. 24, 2024

(54) CONTEXT DRIVEN CONTENT REWIND

(71) Applicant: OpenTV, Inc., San Francisco, CA (US)

(72) Inventor: Kai Sun, Cupertino, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,603

(22) Filed: Oct. 28, 2022

(65) Prior Publication Data

US 2023/0099875 A1 Mar. 30, 2023

Related U.S. Application Data

(63) Continuation of application No. 16/941,895, filed on Jul. 29, 2020, now abandoned, which is a
(Continued)

(51) Int. Cl.
*H04N 21/472* (2011.01)
*H04N 21/422* (2011.01)
(Continued)

(52) U.S. Cl.
CPC ..... *H04N 21/47217* (2013.01); *H04N 21/439* (2013.01); *H04N 21/4394* (2013.01);
(Continued)

(58) Field of Classification Search
CPC ........... H04N 21/47217; H04N 21/439; H04N 21/4394; H04N 21/44; H04N 21/44008;
(Continued)

(56) References Cited

U.S. PATENT DOCUMENTS 6,504,990 B1 * 1/2003 Abecassis .......... H04N 7/17318
348/E7.071
10,764,643 B2 9/2020 Sun
(Continued)

FOREIGN PATENT DOCUMENTS

CN 101228787 7/2008
CN 101778233 A 7/2010
(Continued)

OTHER PUBLICATIONS

"European Application Serial No. 22202023.2, Extended European Search Report mailed Jan. 16, 2023", 6 pgs.
(Continued)

*Primary Examiner* — Nnenna N Ekpo
(74) *Attorney, Agent, or Firm* — Maier & Maier, PLLC

(57) ABSTRACT

Example embodiments provide systems and methods for rewinding digital content during playback based on context of the digital content. A content rewind system electronically accesses digital content. A rewind trigger is detected by the system. The system analyzes the digital content to detect at least one dialog segment within the digital content. The analysis is based on context of the digital content (e.g., dialog within the digital content). The system rewinds playback of the digital content by rewinding to a starting point of a previous dialog segment.

20 Claims, 6 Drawing Sheets

Related U.S. Application Data continuation of application No. 15/183,604, filed on Jun. 15, 2016, now Pat. No. 10,764,643.

(51) Int. Cl.
  *H04N 21/439* (2011.01)
  *H04N 21/44* (2011.01)
  *H04N 21/4415* (2011.01)
  *H04N 21/442* (2011.01)

(52) U.S. Cl.
  CPC ....... *H04N 21/44* (2013.01); *H04N 21/44008* (2013.01); *H04N 21/4415* (2013.01); *H04N 21/44227* (2013.01); *H04N 21/42203* (2013.01)

(58) Field of Classification Search
  CPC ......... H04N 21/4415; H04N 21/44227; H04N 21/42203
  USPC .......................................................... 725/88
  See application file for complete search history.

(56) References Cited

U.S. PATENT DOCUMENTS

| | | | |
|---|---|---|---|
| 10,856,053 B1* | 12/2020 | Shi | ........................ H04N 21/812 |
| 2003/0048930 A1 | 3/2003 | Mihara et al. | |
| 2008/0127244 A1 | 5/2008 | Zhang | |
| 2010/0003008 A1 | 1/2010 | Thomas et al. | |
| 2010/0232765 A1 | 9/2010 | Suginohara et al. | |
| 2014/0350941 A1 | 11/2014 | Zeigler et al. | |
| 2015/0037013 A1 | 2/2015 | Thomas et al. | |
| 2015/0084859 A1 | 3/2015 | Itzhaik | |
| 2015/0139610 A1 | 5/2015 | Syed et al. | |
| 2015/0154982 A1* | 6/2015 | Hong | ..................... H04N 5/783 704/275 |
| 2015/0163558 A1 | 6/2015 | Wheatley | |
| 2016/0132605 A1 | 5/2016 | Jiang | |
| 2016/0154625 A1 | 6/2016 | Stout | |
| 2016/0171739 A1* | 6/2016 | Anderson | ............. G06T 19/006 345/633 |
| 2017/0366857 A1 | 12/2017 | Sun | |
| 2021/0051375 A1 | 2/2021 | Sun | |

FOREIGN PATENT DOCUMENTS

| | | |
|---|---|---|
| CN | 102469309 A | 5/2012 |
| CN | 109314798 A | 2/2019 |
| CN | 109314798 | 7/2022 |
| CN | 115119043 A | 9/2022 |
| CN | 115119043 | 7/2024 |
| EP | 0683481 A2 | 11/1995 |
| EP | 3473002 | 10/2022 |
| IN | 201817045409 A | 10/2019 |
| JP | 2012037910 A | 2/2012 |
| KR | 20150064785 A | 6/2015 |
| WO | WO-2017218736 A1 | 12/2017 |

OTHER PUBLICATIONS

"Chinese Application Serial No. 201780037283.9, Voluntary Amendment filed Sep. 17, 2019", with English claims, 54 pgs.
"U.S. Appl. No. 15/183,604, Examiner Interview Summary mailed Jan. 22, 2020", 3 pgs.
"U.S. Appl. No. 15/183,604, Examiner Interview Summary mailed Sep. 12, 2019", 3 pgs.
"U.S. Appl. No. 15/183,604, Final Office Action mailed Apr. 18, 2019", 13 pgs.
"U.S. Appl. No. 15/183,604, Final Office Action mailed May 17, 2018", 14 pgs.
"U.S. Appl. No. 15/183,604, Final Office Action mailed Jul. 20, 2017", 14 pgs.
"U.S. Appl. No. 15/183,604, Non Final Office Action mailed Apr. 6, 2017", 13 pgs.
"U.S. Appl. No. 15/183,604, Non Final Office Action mailed Oct. 3, 2019", 13 pgs.
"U.S. Appl. No. 15/183,604, Non Final Office Action mailed Oct. 5, 2018", 13 pgs.
"U.S. Appl. No. 15/183,604, Non Final Office Action mailed Oct. 17, 2017", 15 pgs.
"U.S. Appl. No. 15/183,604, Notice of Allowability mailed Jul. 22, 2020", 3 pgs.
"U.S. Appl. No. 15/183,604, Notice of Allowance mailed Apr. 29, 2020", 8 pgs.
"U.S. Appl. No. 15/183,604, Response filed Jan. 3, 2019 to Non Final Office Action mailed Oct. 5, 2018", 11 pgs.
"U.S. Appl. No. 15/183,604, Response filed Feb. 3, 2020 to Non Final Office Action mailed Oct. 3, 2019", 11 pgs.
"U.S. Appl. No. 15/183,604, Response filed Feb. 20, 2018 to Non Final Office Action mailed Oct. 17, 2016", 12 pgs.
"U.S. Appl. No. 15/183,604, Response filed Jul. 6, 2017 to Non Final Office Action mailed Apr. 6, 2017", 12 pgs.
"U.S. Appl. No. 15/183,604, Response filed Sep. 17, 2018 to Final Office Action mailed May 17, 2018", 10 pgs.
"U.S. Appl. No. 15/183,604, Response filed Sep. 26, 2017 to Final Office Action mailed Jul. 20, 2017", 10 pgs.
"U.S. Appl. No. 15/183,604, Response filed Sep. 18, 2019 to Final Office Action mailed Apr. 19, 2019", 11 pgs.
"U.S. Appl. No. 16/941,895, Examiner Interview Summary mailed Oct. 13, 2022", 2 pgs.
"U.S. Appl. No. 16/941,895, Final Office Action mailed Jun. 30, 2022", 16 pgs.
"U.S. Appl. No. 16/941,895, Non Final Office Action mailed Oct. 14, 2021", 11 pgs.
"U.S. Appl. No. 16/941,895, Preliminary Amendment filed Nov. 18, 2020", 6 pgs.
"U.S. Appl. No. 16/941,895, Response filed Jan. 14, 2022 to Non Final Office Action mailed Oct. 14, 2021", 9 pgs.
"Chinese Application Serial No. 201780037283.9, Office Action mailed Jun. 1, 2021", with English translation, 10 pages.
"Chinese Application Serial No. 201780037283.9, Office Action mailed Oct. 29, 2020", with English translation, 8 pages.
"Chinese Application Serial No. 201780037283.9, Office Action mailed Nov. 30, 2021", with English translation, 9 pages.
"Chinese Application Serial No. 201780037283.9, Response filed Feb. 9, 2021 to Office Action mailed Oct. 29, 2020", with English claims, 56 pages.
"Chinese Application Serial No. 201780037283.9, Response filed Aug. 16, 2021 to Office Action mailed Jun. 1, 2021", with English claims, 14 pages.
"Chinese Application Serial No. 201780037283.9, Response Filed Jan. 11, 2022 to Office Action mailed Nov. 30, 2021", with English claims, 13 pages.
"European Application Serial No. 17814064.6, Communication Pursuant to Article 94(3) EPC mailed Jan. 22, 2021", 5 pgs.
"European Application Serial No. 17814064.6, Extended European Search Report mailed Dec. 6, 2019", 7 pgs.
"European Application Serial No. 17814064.6, Response filed May 24, 2021 to Communication Pursuant to Article 94(3) EPC mailed Jan. 22, 2021", with English claims, 7 pages.
"European Application Serial No. 17814064.6, Response filed Jun. 29, 2020 to Extended European Search Report mailed Dec. 6, 2019", 13 pgs.
"European Application Serial No. 17814064.6, Response filed Aug. 1, 2019 to Response to Communication pursuant to Rules 161(2) and 162 EPC Jan. 22, 2019", 4 pgs.
"Indian Application Serial No. 201817045409, First Examination Report mailed May 23, 2021", with English translation, 6 pages.
"Indian Application Serial No. 201817045409, Response Filed Oct. 12, 2021 to First Examination Report mailed May 23, 2021", 45 pages.
"International Application Serial No. PCT/US2017/037615, International Preliminary Report on Patentability mailed Dec. 27, 2018", 8 pgs.

(56) References Cited

OTHER PUBLICATIONS

"International Application Serial No. PCT/US2017/037615, International Search Report mailed Jul. 6, 2017", 3 pgs.

"International Application Serial No. PCT/US2017/037615, Written Opinion mailed Jul. 6, 2017", 6 pgs.

U.S. Appl. No. 15/183,604, U.S. Pat. No. 10,764,643, filed Jun. 15, 2016, Context Driven Content Rewind.

U.S. Appl. No. 16/941,895, filed Jul. 29, 2020, Context Driven Content Rewind.

"European Application Serial No. 22202023.2, Response filed Jul. 21, 2023 to Extended European Search Report mailed Jan. 16, 2023", w claims, 8 pgs.

"Chinese Application Serial No. 202210746377.6, Office Action mailed Sep. 27, 2023", W English Translation, 11 pgs.

"European Application Serial No. 22202023.2, Communication Pursuant to Article 94(3) EPC mailed Mar. 27, 2024", 4 pgs.

"Chinese Application Serial No. 202210746377.6, Response filed Apr. 12, 2024 to Office Action mailed Feb. 22, 2024", with machine translation, 9 pgs.

"Chinese Application Serial No. 202210746377.6, Response filed May 15, 2024", with machine translation, 10 pgs.

"European Application Serial No. 22202023.2, Response filed Jul. 18, 2024 to Communication Pursuant to Article 94(3) EPC mailed Mar. 27, 2024", 8 pgs.

\* cited by examiner

CONTEXT DRIVEN CONTENT REWIND

PRIORITY APPLICATION

This application is a continuation of U.S. patent application Ser. No. 16/941,895, filed Jul. 29, 2020, which is a continuation of U.S. patent application Ser. No. 15/183,604, filed Jun. 15, 2016, the disclosure of which is incorporated herein in its entirety by reference.

FIELD

The present disclosure generally relates to machines configured to the technical field of special-purpose machines that facilitate management of digital content including computerized variants of such special-purpose machines and improvements to such variants, and to the technologies by which such special-purpose machines become improved compared to other special-purpose machines that facilitate management of digital content. In particular, the present disclosure addresses systems and methods to present digital content and, in a specific example embodiment, to mechanisms for dynamically and automatically rewinding and displaying digital content based on context of the digital content.

BACKGROUND

While consuming digital content (e.g., watching a television program or movie), a viewer may miss a critical story development or dialog. If the viewer decides that it may impact his understanding of the storyline, he may rewind the digital content when viewing via over-the-top content (OTT), personal video recorder (PVR) recording, or through a review buffer. One conventional method for implementing rewind is time-based. For instance, the digital content is rewind back by a fixed number of seconds when a viewer presses a rewind button on a remote control. Another conventional method for implementing rewind is scene-based. Scene-based rewind rewinds the digital content back to a location of a series of locations (e.g., by chapter, by frames) where for example, there are scene changes. Further still, the viewer may manually trigger and stop a rewind.

These conventional and manual rewinds do not take into consider verbal dialog when rewinding. For example, an effect of rewind may be overly performed when the rewind takes the viewer back to a beginning of a chapter or scene. This over-rewind results in the viewer waiting for multiple seconds until a segment of missed dialog begins to play back. The waiting not only wastes time and resources, but also disrupts the mental flow of the story.

BRIEF DESCRIPTION OF DRAWINGS

Various ones of the appended drawings merely illustrate example embodiments of the present invention and cannot be considered as limiting its scope.

DETAILED DESCRIPTION

Figure 1:
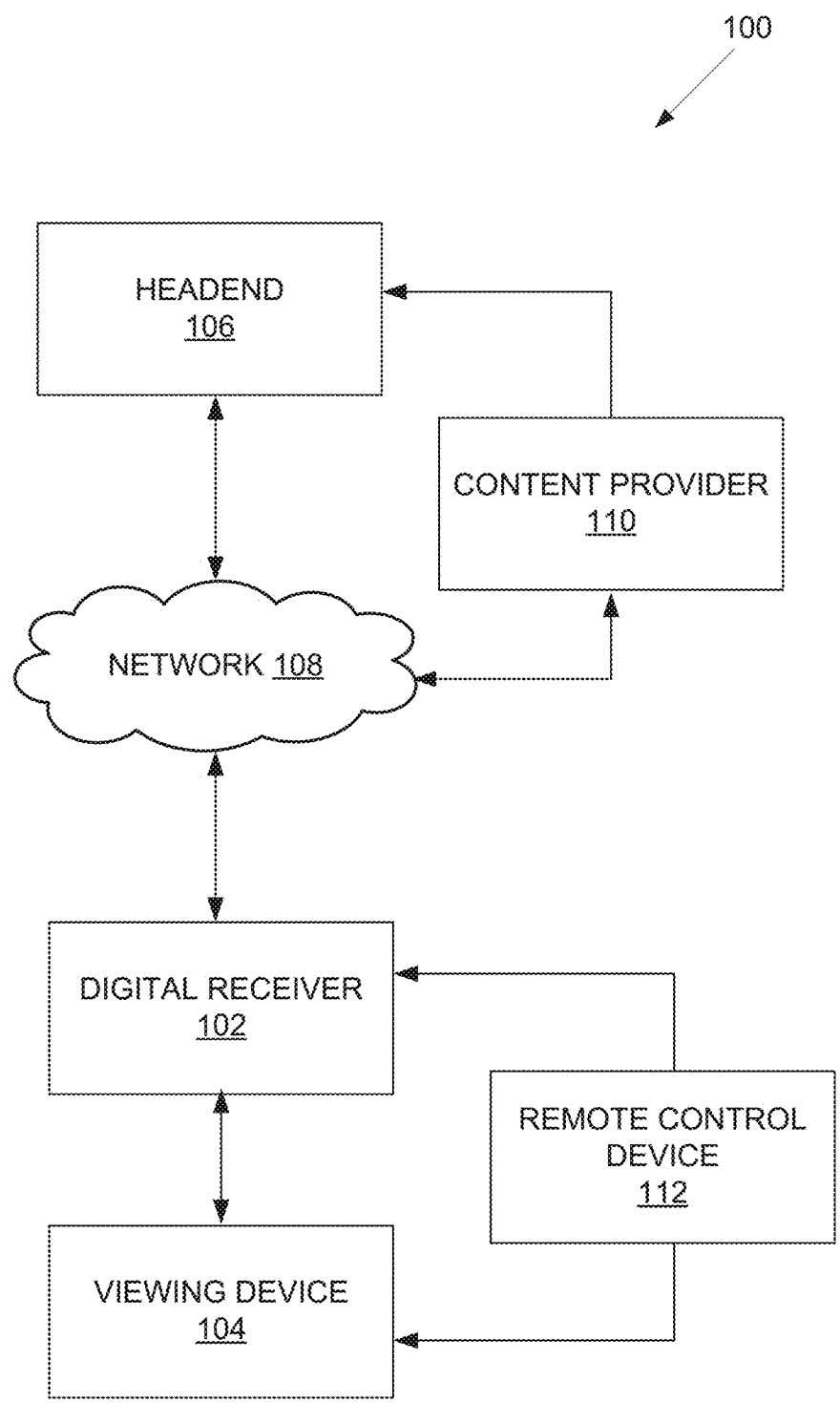
FIG. 1 is a diagram illustrating an example environment for providing context driven rewind of digital content in accordance with an example embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate dynamically and automatically rewinding digital content based on context of the digital content, and example systems (e.g., special-purpose machines) are configured to facilitate dynamically and automatically rewinding digital content based on context of the digital content. In particular, example embodiments provide mechanisms and logic that rewinds digital content during playback based on dialog detected in the digital content (e.g., the context of the digital content). In example embodiments, the system electronically accesses digital content. The system can be located at a digital receiver (e.g., set top box, smart television) or at a headend. The system analyzes the digital content to detect dialog within the digital content, each segment of dialog comprises speech. Each segment of dialog can be verified by using facial recognition/lip movement detection or scene change detection. The digital content is automatically rewound to a beginning of at least a last segment of dialog detected by the system when a rewind trigger is detected. In one embodiment, the rewind trigger may comprises a verbal command uttered by a viewer when the system is in a context driven rewind mode.

As a result, one or more of the methodologies described herein facilitate solving the technical problem of dynamically and automatically rewinding digital content based on context (e.g., dialog detected in the digital content). The methodologies include detecting dialog in digital content and verifying at least a last segment of detected dialog. The logic also dynamically, without human intervention, rewinds the digital content to a beginning (e.g., starting point) of the last segment of detected dialog in response to detecting a rewind trigger. As a result, one or more of the methodologies described herein may obviate a need for certain efforts or resources that otherwise would be involved in manually rewinding and playing back more digital content than is necessary to rehear a last segment of dialog. Additionally, resources used by one or more machines, databases, or devices (e.g., within the environment) may be reduced. Examples of such computing resources include processor cycles, network traffic, memory usage, data storage capacity, power consumption, network bandwidth, and cooling capacity.

With reference to FIG. 1, a diagram illustrating an example environment 100 comprising a system for dynamically rewinding digital content based on context is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

Since the user accesses the digital content through the digital receiver 102, the digital receiver 102 is configured to receive commands with respect to the digital content. In example embodiments, the commands include instructions to fast forward, rewind, and display the digital content (e.g., from a remote control device 112). The instructions causes the digital receiver 102 to, in accordance with one embodiment, rewind the digital content to a beginning of a last segment of dialog when in a context driven rewind mode. Accordingly, in one embodiment, a mechanism on the remote control device 112 is activated and sends a signal to the digital receiver 102 to enter the context driven rewind mode.

In the context driven rewind mode, the rewind of the digital content is automatically performed (e.g., without human intervention of having to manually rewind based on time or scene of the digital content) in response to detecting a rewind trigger. The rewind trigger may comprise activation by a viewer of a button on the remote control device 112 or a verbal command detected by a sensor (e.g., microphone) on the remote control device 112, the digital receiver 102, or the viewing device 104. The verbal command may comprise a statement made by the viewer such as, for example, "what did he/she just say;" "rewind that;" or "wait, go back."

In some embodiments, the digital receiver 102 comprises logic to analyze the digital content and dynamically analyze context of the digital content to cause the context driven rewind. In other embodiments, a headend 106 processes or preprocesses the digital content before transmitting the processed digital content over a network 108 to the digital receiver 102. In example embodiments, the processing detects one or more segments of dialog in the digital content (e.g., a last segment or last set of segments of dialog).

One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Further still, a content provider 110 is coupled to the network 108. The content provider 110 stores or provides the digital content to the headend 106 or the digital receiver 102 via the network 108. The digital content may comprise audio/video content (e.g., movies, television shows) or audio content (e.g., podcasts).

It is noted that the environment 100 shown in FIG. 1 is merely an example. For instance, not all components of the environment 100 may be shown. Additionally, some components of the environment 100 may be combined. For example, the digital receiver 102 may be embodied within the viewing device 104 to form a single device (e.g., a smart television). Furthermore, operations discussed as occurring at the digital receiver 102 may be performed at the headend 106 whereby processed digital content is transmitted to the digital receiver 102 for presentation.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines illustrated in FIG. 1 may be combined into a single system or machine, and the functions described herein for any single system or machine may be subdivided among multiple systems or machines.

Figure 2:
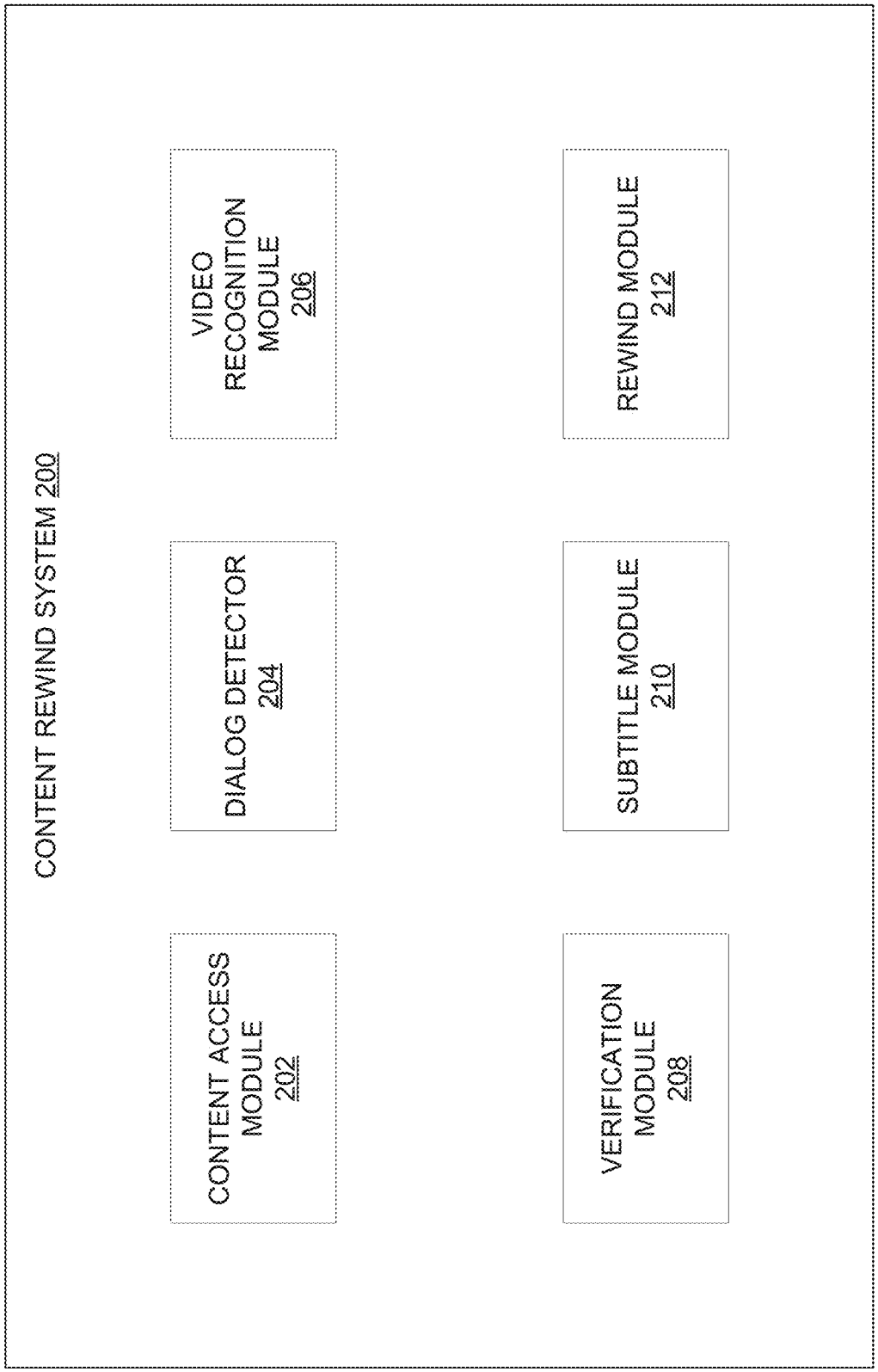
FIG. 2 is a block diagram illustrating an example embodiment of a context rewind system.

FIG. 2 is a block diagram illustrating an example embodiment of a context rewind system 200. In example embodiments, the context rewind system 200 is embodied within the digital receiver 102. In an alternative embodiment, the context rewind system 200 is embodied within the headend 106, and the headend 106 processes the digital content before transmitting the processed digital content to the digital receiver 102 for presentation. The context rewind system 200 is configured to analyze and process the digital content such that the digital content is rewound according to context (e.g., dialog) detected in the digital content. In particular, the digital content is rewound to a beginning of a last dialog segment (also referred to as a "starting point"). To enable these operations, the context rewind system 200 comprises a content access module 202, a dialog detector 204, a video recognition module 206, a verification module 208, a subtitle module 210, and a rewind module 212, all of which may be configured to communicate with each other (e.g., over a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the digital receiver 102 while others are embodied within the headend 106. The context rewind system 200 may comprise other components not pertinent to example embodiments that are not shown or discussed.

The content access module 202 manages data exchange between the context rewind system 200 and other components of the environment 100 in order to access the digital content. For example, the context rewind system 200 receives or retrieves digital content from the headend 106 (e.g., in embodiments where the context rewind system 200 is embodied within the digital receiver 102) or from the content provider 110. In embodiments where the digital receiver 102 is performing the acceleration processing, the digital content is temporarily buffered and stored by the content access module 202 to enable the context rewind system 200 to dynamically process the digital content prior to presentation on the viewing device 104 and to provide the ability to rewind the digital content.

The dialog detector 204 analyzes the digital content accessed or retrieved by the content access module 202. In particular, the dialog detector 204 examines the digital content to detect segments of dialog, and more particularly, at least the last segment of dialog. The dialog detector 204 may also separate dialog from music or background noise. In example embodiments, the dialog detector 204 detects dialog based on pitch within a speech range found in an audio track of the digital content. Additionally, the dialog detector 204 uses contextual information to detect speech. For example, a sentence is typically a few seconds long. Therefore, if the dialog detector 204 detects something less than a 0.1 seconds, the dialog detector 204 determines that it is not speech (e.g., a background noise). In example embodiments, the dialog segments detected by the dialog detector 204 are used as a baseline, and detection enhancements are performed by, for example, the video recognition module 206 and the verification module 208 as discussed further below.

The video recognition module 206 manages video cues that assist in verifying dialog segments. In some embodiments, the video recognition module 206 detects scene changes. Typically, speech conversations do not occur across a scene change. Therefore, the detection of the scene change by the video recognition module 206 is used by the verification module 208 to verify if dialog is present in a particular digital content portion. For example, a segment of dialog (also referred to as "dialog segment") can be aligned with a scene change boundary.

In some embodiments, the video recognition module 206 performs facial recognition and lip movement detection. Facial recognition and lip movement detection data is also used by the verification module 208 to confirm, verify, or adjust the dialog segments. For example, a detected portion of dialog that extends beyond lip movement is determined to be noise that should be ignored. Conversely, the facial recognition and lip movement detection data can identify dialog missed by the dialog detector 204 (e.g., lip movement prior to the dialog segment identified by the dialog detector 204).

The subtitle module 210 manages use of subtitles (also referred to as "closed caption data") in the context analysis. The closed caption data comprises timing information (e.g., start and stop times of dialog). In one embodiment, the subtitle module 210 uses this information to confirm, verify, or adjust the dialog segments detected by the dialog detector 204. The use of subtitles typically results in less costly computations versus operations performed by the dialog detector 204, video recognition module 206, and the verification module 208 (e.g., instead of detecting the dialog or performing verification/cross-check the detected dialog). Therefore, in an alternative embodiment, the processing by the subtitle module 210 can be used instead of processing by the speech detector 204 to reduce computation costs.

The content rewind module 212 manages the rewind of the digital content when the system is in the context driven rewind mode. In an example embodiment, the content rewind module 212 rewinds the digital content to a beginning of a last dialog segment (e.g., the starting point) based on a rewind trigger. In a further embodiment, if the viewer provides successive rewind triggers (e.g., "Rewind that. Rewind again.") within a predetermined period of time (e.g., 2 seconds), the content rewind module 212 rewinds sequentially to a previous-n dialog segment, where n corresponds to a number of successive rewind triggers.

Figure 3:
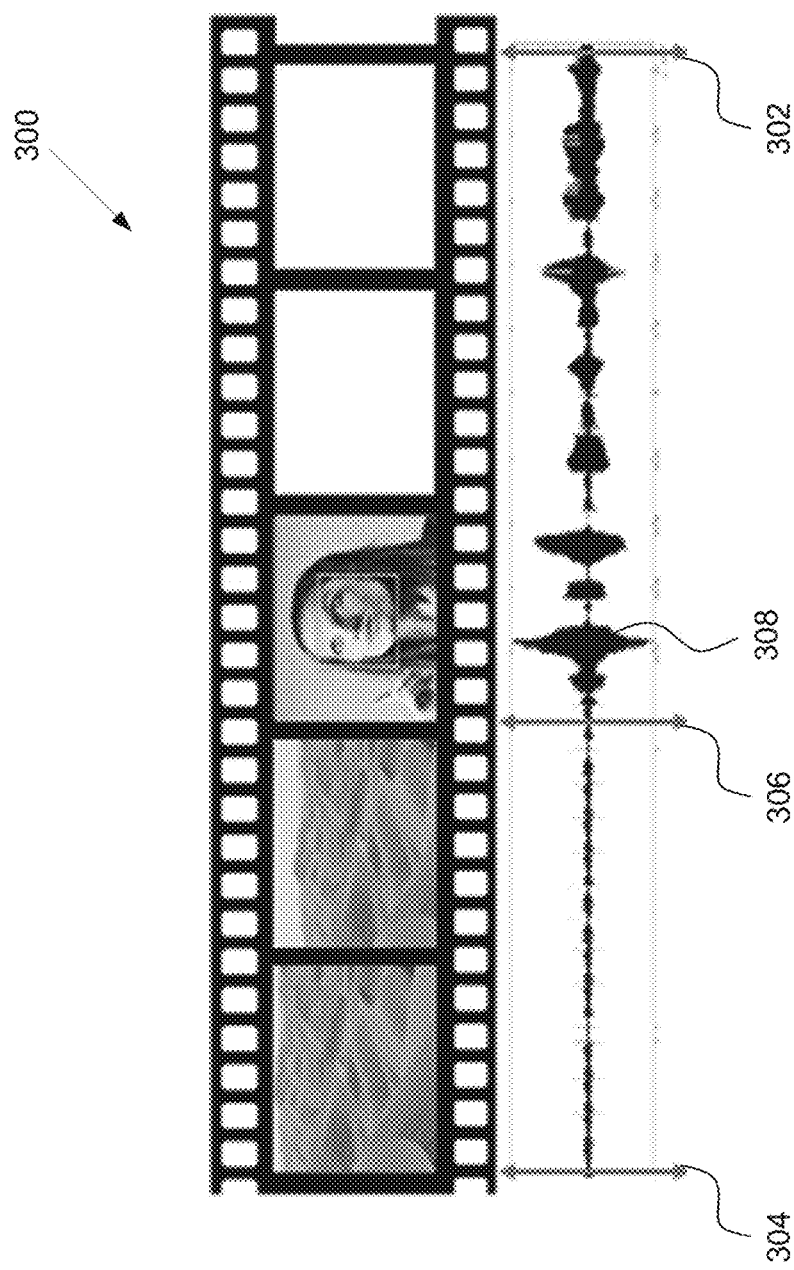
FIG. 3 is a diagram illustrating context driven rewind of digital content in accordance with an example embodiment.

FIG. 3 is a diagram illustrating context driven rewind analysis and rewind of digital content. In particular, FIG. 3 shows a segment of digital content 300 that includes five portions. The portions may correspond to various parts of one or more scenes, to a particular amount of digital content 300 (e.g., 50 seconds of digital content whereby each portion is 10 seconds), or any other manner of differentiating and presenting the digital content 300.

In an example embodiment, a user is watching the digital content 300. At a position 302, the user issues a rewind trigger. That is, for example, the user utters a verbal command that indicates that the user wants a last dialog segment to be repeated. In a time-based rewind, the system may rewind to position 304. Alternatively, in a scene-based rewind, the system rewinds to a beginning of a scene or chapter (which may be located at position 304). The time-based rewind and scene based rewind result in a waste of time and resources as the user is forced to view a non-informative section between position 304 and position 306 since the dialog does not begin until position 306.

Position 306 is a starting point for the last dialog segment (e.g., between position 306 and 302). The last dialog segment is detected through voice activity detection from audio signals 308 in the digital content 300. In one embodiment, the last dialog segment is verified (e.g., precision assisted) by face detection and lip movement detection. As a result, when the rewind trigger is detected at positional 302, the system rewinds playback of the digital content to position 306.

Figure 4:
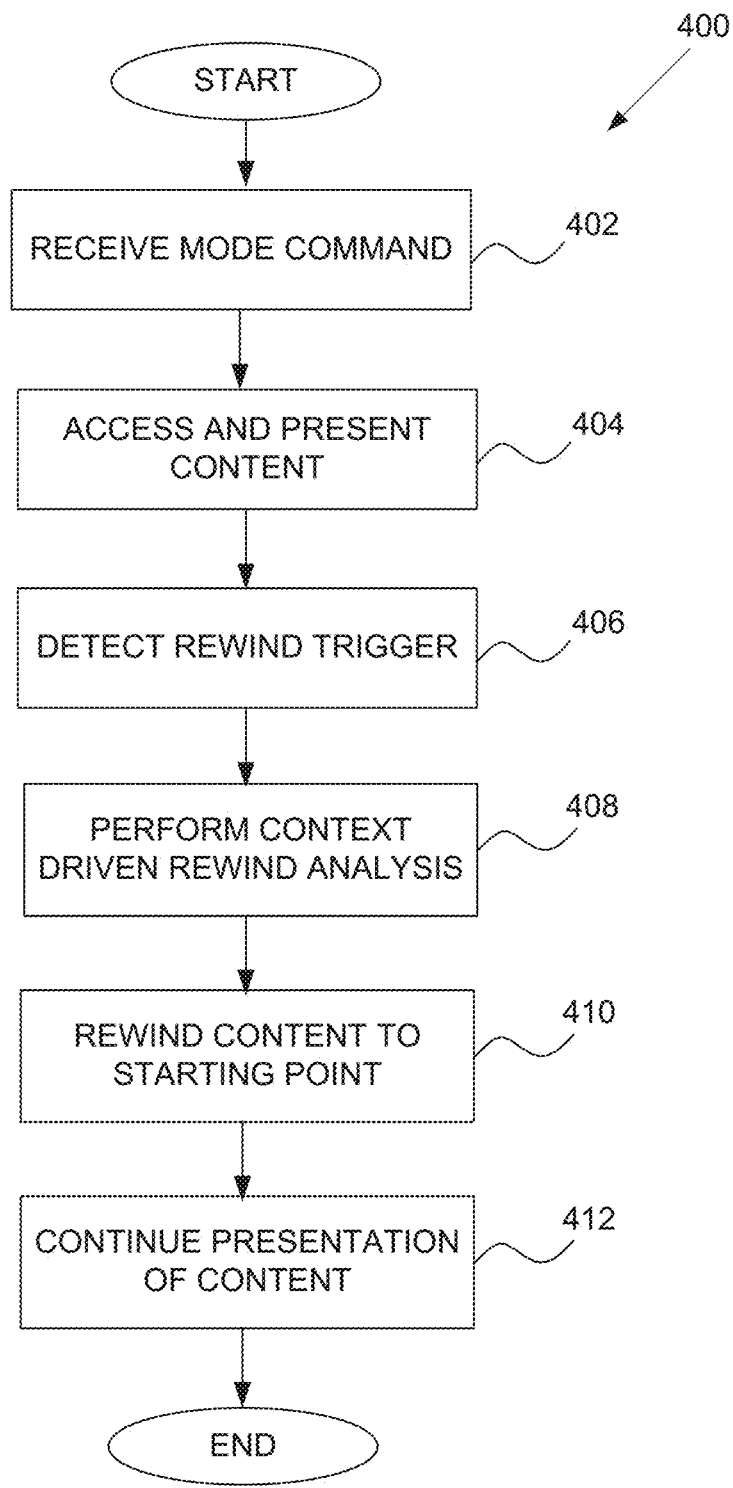
FIG. 4 is a flow diagram of an example method for providing context driven rewind.

FIG. 4 is a flow diagram of an example method 400 for context driven rewind of digital content. In example embodiments, the method 400 is performed in part or in whole by components of the context rewind system 200 which can be embodied either in whole or part in the digital receiver 102 or the headend 106. Accordingly, the method 400 is described by way of example with reference to the context rewind system 200. However, it shall be appreciated that at least some of the operations of the method 400 may be deployed on various other hardware configurations or be performed by similar components residing elsewhere in the environment 100. Therefore, the method 400 is not intended to be limited to the context rewind system 200.

In operation 402, a command is received to activate the context driven rewind mode. In one embodiment, a signal is received from a remote control device that initiates the activation of the context driven rewind mode. In the context driven rewind mode, the digital content is automatically rewound based on context of the digital content to a beginning of a previous (or preceding) dialog segment when a rewind trigger is detected. In one embodiment, the rewind occurs automatically (e.g., without human intervention of having to manually rewind digital content) in response to detection of the rewind trigger.

In operation 404, the digital content is accessed. In example embodiments, the digital content is retrieved or received by the content access module 202 (e.g., from the headend 106 or from the content provider 110). In embodiments where the digital receiver 102 is performing the context driven rewind analysis, the digital content may be accessed ahead of a section being concurrently played back and locally buffered by the content access module 202 to enable the context rewind system 200 to dynamically process the digital content prior to presentation on the viewing device 104. In some embodiments, access of the digital content (operation 404) occurs prior to the receiving of the context driven rewind command (operation 402). For example, the context driven rewind command can be received at any time before or during playback of the digital content to place the system into a context driven rewind mode.

In operation 406, a rewind trigger is detected. In one embodiment, a manual command (e.g., selection of a button) may be detected by a sensor at the remote control device 112 or digital receiver 102 that indicates that the viewer wants to rewind to a beginning of a previous dialog segment. In another embodiment, the remote control device 112, the digital receiver 102, or the viewing device 104 detects a verbal command (e.g., a verbal statement) issued by the viewer (e.g., via a sensor such as a microphone). Accordingly, while in the context driven rewind mode, a sensor in the remote control device 112, the digital receiver 102, or the viewing device 104 monitors for verbal commands that will trigger the context rewind. For example, the viewer may utter "what did he say" or "I missed that." These verbal commands indicate that the viewer wants to rewind to the beginning of a previous dialog segment (e.g., the last dialog segment). It should be appreciated that different verbal commands may be used. Accordingly, a library of verbal commands may be stored in, for example, the remote control device 112 or the digital receiver 102. Any utterances detected by the sensor may then be compared with content of the library of verbal commands to detect a match.

In operation 408, context driven rewind analysis is performed on the digital content. The context driven rewind analysis results in identification of one or more dialog segments in the digital content, and in particular, a last dialog segment. In some embodiments, a series of previous dialog segments may be identified based on the viewer issuing multiple rewind triggers within a relative short amount of time to rewind more than one dialog segment.

In embodiments where the headend 106 performs the context driven rewind analysis, operation 408 is optional or does not occur. In these embodiments, the headend 106 performs the analysis prior to the rest of the operations of the method 400 or performs the analysis concurrently with the access and presentation of the digital content (operation 404) (e.g., in embodiments where the digital content is streamed to the digital receiver 102 relatively in real time) in order to determine dialog segments prior to playback of the dialog segment to the viewer. Operation 408 will be discussed in more detail in connection with FIG. 5.

In operation 410, the digital content is rewound to a starting point of a previous dialog segment. If more than one rewind trigger is received consecutively and within a short amount of time (e.g. within 2 seconds), for example, (e.g., "Rewind that. Rewind that again."), then the digital content is sequentially rewound to a starting point of a previous-n dialog segment, where n corresponds to a number of successive rewind triggers. For example, if the view issues a verbal command "Rewind; again; again," then the rewind module 212, rewinds the digital content back three dialog segments. In operation 412, the presentation of the digital content continues from the starting point that was rewound to in operation 410.

Figure 5:
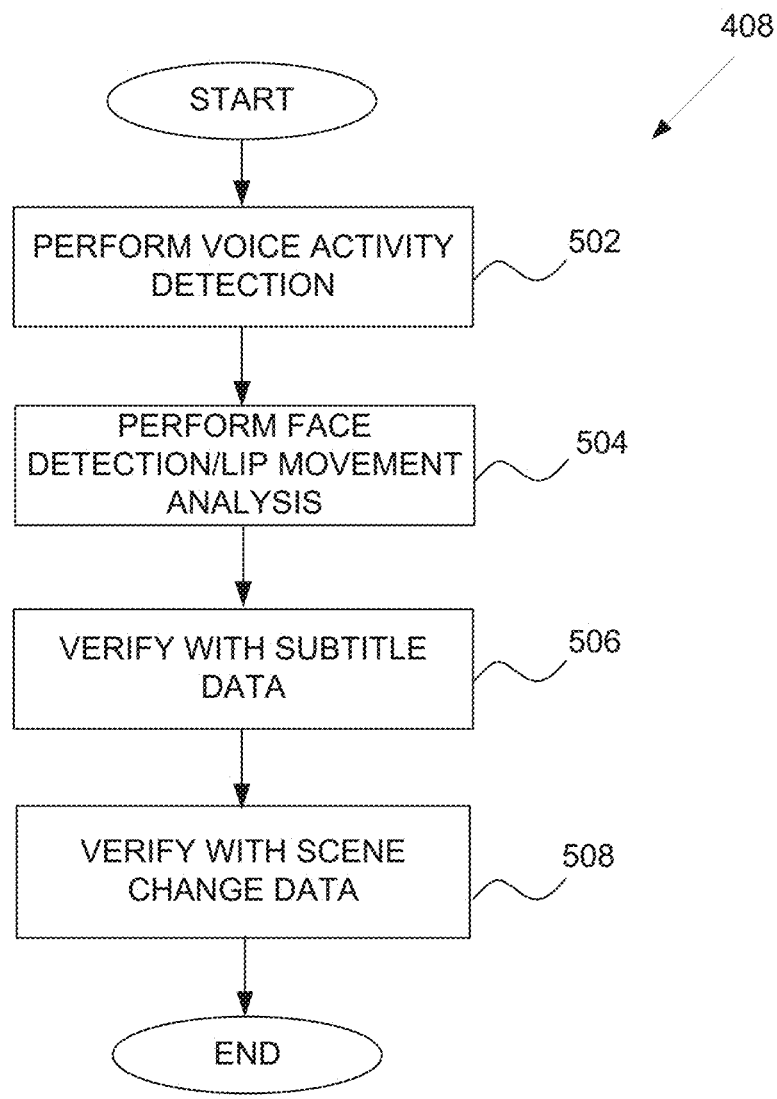
FIG. 5 is a flow diagram of an example method for verifying and adjusting a starting point for the context driven rewind.

FIG. 5 is a flow diagram of an example method (operation 408) for verifying the dialog segments. In some embodiments, the method is performed in part or in whole by components of the context rewind system 200 which can be embodiment either in whole or part in the digital receiver 102 or the headend 106. Accordingly, the method is described by way of example with reference to the context rewind system 200. However, it shall be appreciated that at least some of the operations of the method may be deployed on various other hardware configurations or be performed by similar components residing elsewhere in the environment 100. Therefore, the method is not intended to be limited to the context rewind system 200.

In operation 502, voice activity detection is performed. In example embodiments, the dialog detector 204 detects dialog segments in the digital content. For example, the dialog detector 204 detects dialog based on pitch within a speech range found in an audio track of the digital content. Additionally, the dialog detector 204 uses contextual information to detect speech (e.g., length of detected speech).

In operation 504, facial recognition/lip detection is used to verify the dialog segments. In example embodiments, the video recognition module 206 manages video cues that assist in verifying dialog segments. As such, the video recognition module 206 performs face recognition and lip movement detection in operation 504. The face recognition and lip movement detection information is used by the verification module 208 to verify or adjust the dialog segments. For example, a portion of a dialog segment that extends beyond detected lip movement is determined to be noise that should be ignored during rewind. Conversely, the use of face recognition and lip movement detection information can detect dialog that may have been missed by the speech detector 204.

In operation 506, the dialog segments are verified using subtitle data (also referred to as "closed caption data"). In example embodiments, the subtitle module 210 uses closed caption data (e.g., timing information such as start and stop times of speech) to confirm, verify, or adjust the dialog segments detected by the speech detector 204 (e.g., verify or adjust start and stop times of the audio portions). While the use of subtitle data can be used to verify or adjust dialog segments already detected by the speech detector 204, alternatively, the subtitle data can be used to determine the dialog segments instead of processing by the speech detector 204.

In operation 508, scene change data is used to verify the dialog segments. Accordingly, the video recognition module 206 detects scene changes. Typically, dialog does not occur across a scene change. Therefore, the detection of the scene change by the video recognition module 206 is used by the verification module 208 to verify whether dialog should be present in a particular dialog segment (e.g., whether dialog is detected over a scene change).

While the method discusses using subtitles, facial recognition, and scene changes to verify or adjust audio portions, alternative embodiments may comprise less operations. That is, one or more of operations 504-508 may not be practiced or is optional in alternative embodiments.

Figure 6:
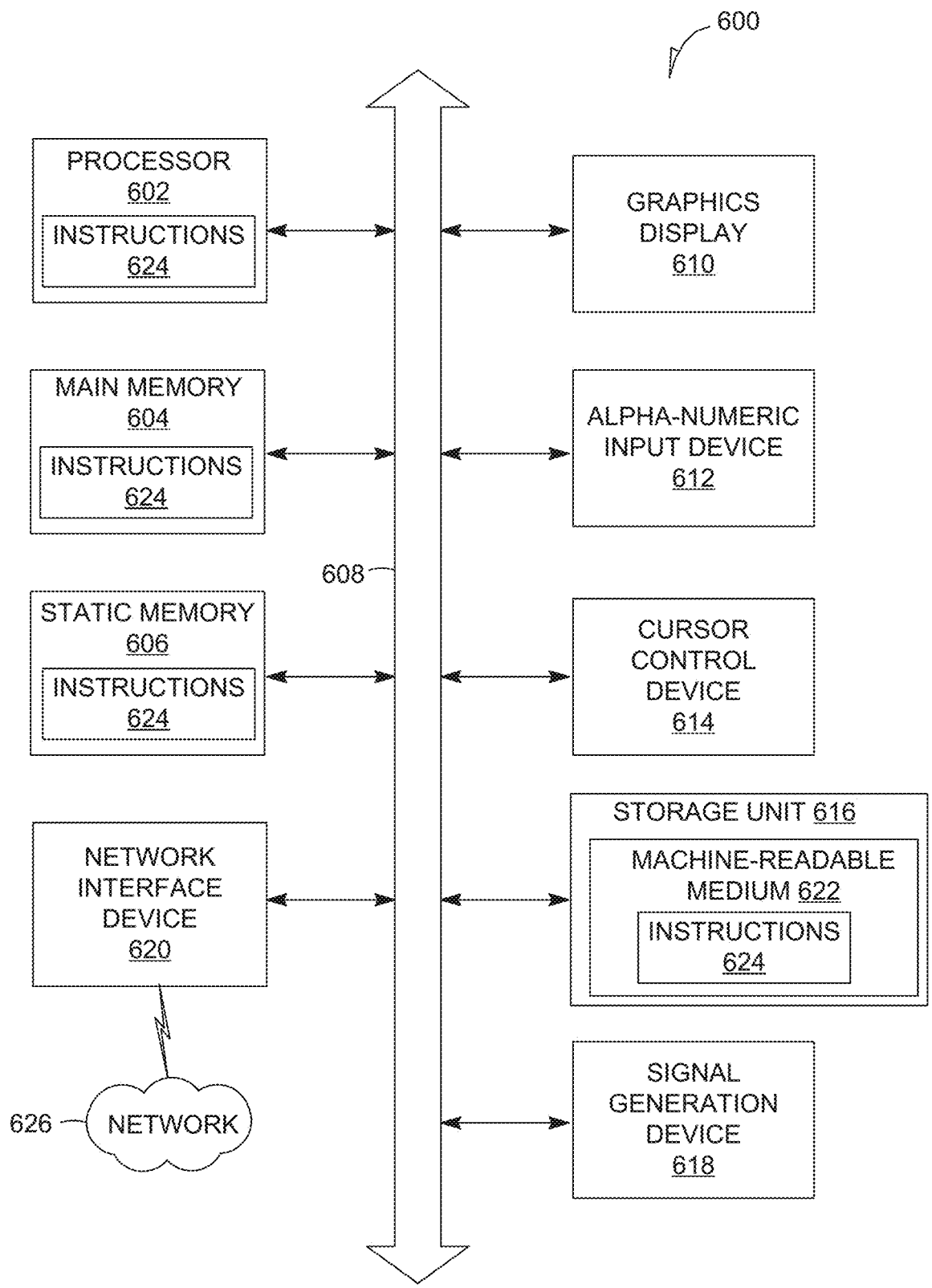
FIG. 6 is a diagrammatic representation of a machine in an example form of a computing system within which a set of instructions may be executed for causing the machine to perform any one or more of the methodologies discussed herein, according to an example embodiment.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer device (e.g., a computer) within which the instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 4 and 5. The instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. The machine 600 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 600 capable of executing the instructions 624, sequentially or otherwise, that specify actions to be taken by that machine 600. Further, while only a single machine 600 is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media 622 (e.g., tangible and non-transitory machine-readable media).

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown, in an example embodiment, to be a single medium, the term "machine-readable medium" should be taken to include a single medium or multiple media (e.g., a centralized or distributed database, or associated caches and servers) able to store instructions 624. The term "machine-readable medium" shall also be taken to include any medium, or combination of multiple media, that is capable of storing instructions 624 for execution by a machine (e.g., machine 600), such that the instructions 624, when executed by one or more processors of the machine 600 (e.g., processor 602), cause the machine 600 to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 622 is non-transitory in that it does not embody a propagating or transitory signal. However, labeling the machine-readable medium 622 as "non-transitory" should not be construed to mean that the medium is incapable of movement—the medium should be considered as being transportable from one physical location to another. Additionally, since the machine-readable medium 622 is tangible, the medium may be considered to be a machine-readable storage device.

Furthermore, the machine-readable medium 622 does not comprise any transitory signals. In some example embodiments, the instructions 624 for execution by the machine 600 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 624)

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Example 1 is a method for dynamically and automatically providing context driven content rewind. Digital content is electronically accessed by a content access module. The digital content is displayed on a device of a user. A rewind trigger issued by the user is detected. In response to detecting the rewind trigger, the display of the digital content is rewound, by a rewind module, to a starting point of a previous dialog segment identified based on analysis of dialog in the digital content.

In example 2, the subject matter of example 1 can optionally include analyzing the digital content, by a speech detector, to identify at least one dialog segment within the digital content, the analyzing being based on dialog detected in the digital content, the at least one dialog segment comprising the previous dialog segment.

In example 3, the subject matter of examples 1-2 can optionally include verifying the at least one dialog segment.

In example 4, the subject matter of examples 1-3 can optionally include adjusting the at least one dialog segment based on the verifying, the adjusting comprising changing a starting point or ending point of the at least one dialog segment.

In example 5, the subject matter of examples 1-4 can optionally include wherein the verifying comprises performing lip movement detection on the digital content and determining whether the lip movement detection coincides with a starting point and ending point of the at least one dialog segment.

In example 6, the subject matter of examples 1-5 can optionally include wherein the verifying comprises detecting a scene change in the digital content and determining whether the at least one dialog segment occurs over the scene change.

In example 7, the subject matter of examples 1-6 can optionally include wherein the verifying comprises accessing subtitle data, whereby the subtitle data comprises timing information for dialog in the digital content, and using the timing information to verify the at least one previously consumed dialog segment.

In example 8, the subject matter of examples 1-7 can optionally include receiving an activation command to activate a context driven rewind mode, the context driven rewind mode causing the detecting and rewinding to automatically occur in response to detection of the rewind trigger.

In example 9, the subject matter of examples 1-8 can optionally include actively monitoring for the rewind trigger when in the context driven rewind mode.

In example 10, the subject matter of examples 1-9 can optionally include analyzing the digital content to detect at least one dialog segment using timing information from subtitle data, the at least one dialog segment comprising the previous dialog segment.

In example 11, the subject matter of examples 1-10 can optionally include wherein the rewind trigger is a verbal command indicating that a viewer wants the previous dialog segment to be replayed.

Example 12 is a machine-readable storage device storing instructions which, when executed by the at least one processor of a machine, cause the machine to perform operations. The operations comprise electronically accessing digital content; causing display of the digital content on a device of a user; detecting a rewind trigger issued by the user; and in response to detecting the rewind trigger, rewinding the display of the digital content to a starting point of a previous dialog segment identified based on analysis of dialog in the digital content.

In example 13, the subject matter of example 12 can optionally include wherein the operations further comprise analyzing the digital content to identify at least one dialog segment within the digital content, the analyzing being based on dialog detected in the digital content, the at least one dialog segment comprising the previous dialog segment.

In example 14, the subject matter of examples 12-13 can optionally include wherein the operations further comprise receiving an activation command to activate a context driven rewind mode, the context driven rewind mode causing the detecting and rewinding to automatically occur in response to detection of the rewind trigger.

In example 15, the subject matter of examples 12-14 can optionally include wherein the operations further comprise actively monitoring for the rewind trigger when in the context driven rewind mode.

Example 16 is a system for dynamically and automatically providing context driven content rewind. The system includes one or more processors configured to perform operations comprising electronically accessing digital content; causing display of the digital content on a device of a user; detecting a rewind trigger issued by the user; and in response to detecting the rewind trigger, rewinding the display of the digital content to a starting point of a previous dialog segment identified based on analysis of dialog in the digital content.

In example 17, the subject matter of example 16 can optionally include wherein the operations further comprise analyzing the digital content to identify at least one dialog segment within the digital content, the analyzing being based on dialog detected in the digital content, the at least one dialog segment comprising the previous dialog segment.

In example 18, the subject matter of examples 16-17 can optionally include wherein the operations further comprise receiving an activation command to activate a context driven rewind mode, the context driven rewind mode causing the detecting and rewinding to automatically occur in response to detection of the rewind trigger.

In example 19, the subject matter of examples 16-18 can optionally include wherein the operations further comprise actively monitoring for the rewind trigger when in the context driven rewind mode.

In example 20, the subject matter of examples 16-19 can optionally include wherein the rewind trigger is a verbal command indicating that a viewer wants the previous dialog segment to be replayed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   electronically accessing, by a content access module, digital content;
   analyzing the digital content, by a speech detector, to identify at least one dialog segment within the digital content;
   verifying the at least one dialog segment, the verifying comprising:
      performing facial recognition and lip movement detection on the digital content, and
      determining whether the facial recognition and lip movement detection coincides with a starting point and/or an ending point of the at least one dialog segment; and
   adjusting the at least one dialog segment based on the facial recognition and lip movement detection not coinciding with the starting point and/or the ending point of the at least one dialog segment, the adjusting comprising changing the starting point and/or the ending point of the at least one dialog segment.

2. The method of claim 1, wherein the verifying further comprises:
   detecting a scene change in the digital content; and
   determining whether the at least one dialog segment occurs over the scene change.

3. The method of claim 2, wherein the adjusting comprises adjusting the at least one dialog segment to be aligned with a scene change boundary.

4. The method of claim 1, wherein the verifying further comprises:
   accessing subtitle data, the subtitle data comprising timing information for dialog in the digital content, and
   using the timing information to verify the at least one dialog segment.

5. The method of claim 4, wherein the adjusting comprises aligning the dialog segment with the timing information.

6. The method of claim 1, wherein the analyzing further comprises analyzing the digital content to detect the at least one dialog segment using timing information from subtitle data.

7. The method of claim 1, wherein the verifying includes using subtitle data or using scene change data.

8. A system comprising:
   one or more processors; and
   a memory storing instructions, which, when executed by the one or more processors, performs operations comprising:
      electronically accessing digital content;
      analyzing the digital content to identify at least one dialog segment within the digital content;
      verifying the at least one dialog segment, the verifying comprising:
         performing facial recognition and lip movement detection on the digital content, and
         determining whether the facial recognition and lip movement detection coincides with a starting point and/or an ending point of the at least one dialog segment; and
      adjusting the at least one dialog segment based on the facial recognition and lip movement detection not coinciding with the starting point and/or the ending point of the at least one dialog segment, the adjusting comprising changing the starting point and/or the ending point of the at least one dialog segment.

9. The system of claim 8, wherein the verifying further comprises:
   detecting a scene change in the digital content; and
   determining whether the at least one dialog segment occurs over the scene change.

10. The system of claim 9, wherein the adjusting comprises adjusting the at least one dialog segment to be aligned with a scene change boundary.

11. The system of claim 8, wherein the verifying further comprises:
   accessing subtitle data, the subtitle data comprising timing information for dialog in the digital content, and
   using the timing information to verify the at least one dialog segment.

12. The system of claim 11, wherein the adjusting comprises aligning the dialog segment with the timing information.

13. The system of claim 8, wherein the analyzing further comprises analyzing the digital content to detect the at least one dialog segment using timing information from subtitle data.

14. The system of claim 8, wherein the verifying includes using subtitle data or using scene change data.

15. A non-transitory machine-storage medium having instructions that, when executed by one or more hardware processors of a machine, cause the machine to perform operations comprising:
   electronically accessing digital content;
   analyzing the digital content to identify at least one dialog segment within the digital content;
   verifying the at least one dialog segment, the verifying comprising:
      performing facial recognition and lip movement detection on the digital content, and determining whether the facial recognition and lip movement detection coincides with a starting point and/or an ending point of the at least one dialog segment; and adjusting the at least one dialog segment based on the facial recognition and lip movement detection not coinciding with the starting point and/or the ending point of the at least one dialog segment, the adjusting comprising changing the starting point and/or the ending point of the at least one dialog segment.

16. The machine-storage medium of claim 15, wherein the verifying further comprises:

detecting a scene change in the digital content; and determining whether the at least one dialog segment occurs over the scene change.

17. The machine-storage medium of claim 16, where the adjusting comprises adjusting the at least one dialog segment to be aligned with a scene change boundary.

18. The machine-storage medium of claim 15, wherein the verifying further comprises:

accessing subtitle data, the subtitle data comprising timing information for dialog in the digital content, and using the timing information to verify the at least one dialog segment.

19. The machine-storage medium of claim 18, wherein the adjusting comprises aligning the dialog segment with the timing information.

20. The machine-storage medium of claim 15, wherein the analyzing further comprises analyzing the digital content to detect the at least one dialog segment using timing information from subtitle data.

* * * * *